(12) United States Patent
Song et al.

(10) Patent No.: US 9,341,925 B2
(45) Date of Patent: May 17, 2016

(54) RIG FOR MULTI CAMERA SHOOTING

(71) Applicant: CJ CGV CO., LTD., Seoul (KR)

(72) Inventors: Isaac Song, Seoul (KR); Ine Park, Seoul (KR); Hyung Jin Yoon, Anyang-si (KR)

(73) Assignee: CJ CGV CO., LTD., Seoul (KR)

( * ) Notice: Subject to any disclaimer, the term of this patent is extended or adjusted under 35 U.S.C. 154(b) by 0 days.

(21) Appl. No.: 14/873,967

(22) Filed: Oct. 2, 2015

(65) Prior Publication Data

US 2016/0097966 A1    Apr. 7, 2016

(30) Foreign Application Priority Data

Oct. 2, 2014    (KR) .................. 10-2014-0133274

(51) Int. Cl.
*G03B 17/56*    (2006.01)
(52) U.S. Cl.
CPC ................... *G03B 17/561* (2013.01)
(58) Field of Classification Search
USPC ......................... 396/419, 428, 322
See application file for complete search history.

(56) References Cited

U.S. PATENT DOCUMENTS

| | | | |
|---|---|---|---|
| 6,950,121 B2 * | 9/2005 | Tserkovnyuk | G03B 35/08 348/47 |
| 7,848,635 B2 | 12/2010 | Routhier | |
| 8,408,819 B2 * | 4/2013 | Pupulin | F16M 11/18 396/428 |
| 9,052,571 B1 * | 6/2015 | Lapstun | G03B 15/006 |
| 2013/0027773 A1 | 1/2013 | Segawa | |

FOREIGN PATENT DOCUMENTS

| | | |
|---|---|---|
| JP | 2006091177 A | 4/2006 |
| JP | 2010154105 A | 7/2010 |
| KR | 1020100001924 A | 1/2010 |
| KR | 101162058 B1 | 6/2012 |
| KR | 101165223 B1 | 7/2012 |
| KR | 101213962 B1 | 12/2012 |
| KR | 101213962 B1 | 1/2013 |
| KR | 101246025 B1 | 3/2013 |

OTHER PUBLICATIONS

International Search Report mailed Jan. 12, 2016, for PCT/KR2015/010378, citing the above reference(s).

* cited by examiner

*Primary Examiner* — Clayton E LaBalle
*Assistant Examiner* — Linda B Smith
(74) *Attorney, Agent, or Firm* — Hauptman Ham, LLP

(57) ABSTRACT

Disclosed herein is a rig for multi-camera photographing. The rig for multi-camera photographing includes a cover frame, a center base plate fixed and installed in a center line over the cover frame, and a left rotational movement plate and a right rotational movement plate disposed on the left and right sides of the center base plate and disposed in such a way as to rotatably move around rotational movement shafts protruded over the cover frame.

15 Claims, 7 Drawing Sheets

RIG FOR MULTI CAMERA SHOOTING

CROSS REFERENCE TO RELATED APPLICATION

The present application claims the benefit of Korean Patent Application No. 10-2014-0133274 filed in the Korean Intellectual Property Office on Oct. 2, 2014, the entire contents of which are incorporated herein by reference.

BACKGROUND OF THE INVENTION

1. Technical Field

The present invention relates to a rig for multi-camera photographing and, more particularly, to a rig for multi-camera photographing, which includes left/right rotational movement plates capable of freely rotating in both clockwise and counterclockwise directions on the left and right sides of a fixed type center base plate so that the rotation angle of each rotational movement plate can be easily controlled and an angle between cameras can be conveniently controlled when a multi-projection image is captured.

2. Description of the Related Art

The movie of various entertainments enjoyed by the general public is considered as the most important genre along with TV and music in terms of the popularity and business volume.

Recently, a 4D movie to which physical effects have been added is popularized in addition to a 3D movie to which stereoscopic visual effects have been assigned without using a known plane movie photographing scheme. A single movie has become able to be enjoyed in various ways.

There is a multi-projection image in the development of such a new movie photographing scheme. The multi-projection image means that three or more multi-projection surfaces including left/right surfaces are used as a complex projection surface without using only one front surface as a projection surface in a conventional cubic type movie theater.

A multi-projection image exceeds IMAX which had an image of the greatest size so far and can implement a very large screen of a human's viewing angle or higher. A multi-projection image has been able to provide a sense of further extended space, a sense of realism, and a sense of immersion by grafting 3D and 4D technologies on the multi-projection image.

In order to capture a multi-projection image, several cameras need to be mounted on a single rig. In this case, the angles of cameras on the left and right sides of a camera, that is, the center, need to be able to be properly set. The reason for this is that in order to merge a plurality of images captured by respective cameras into one image, images on the left and right sides of a center image need to be overlapped in a specific region and thus a stitching task for connecting the images may be performed. However, since the angle of view of a camera is changed depending on lens specifications, an angle between cameras needs to be controlled again if a lens is changed due to a need in a photographing scheme when a multi-projection image is captured.

However, only a rig for capturing a stereoscopic image, for example, a rig shown in U.S. Pat. No. 7,848,635 has been introduced as a rig on which several cameras can be consecutively mounted horizontally, but a rig for multi-projection photographing capable of controlling an angle has not been introduced.

PRIOR ART DOCUMENT

Patent Document (Patent Document 1) U.S. Pat. No. 7,848,635 (Dec. 7, 2010)

SUMMARY OF THE INVENTION

An object of the present invention is to provide a rig for multi-camera photographing, which is capable of controlling an angle between cameras accurately and conveniently when a multi-projection image is captured by solving a problem in that it is difficult to set an accurate angle and a repetition task needs to be prepared when the angles of left and right cameras are controlled using a conventional rig for multi-camera photographing.

An embodiment of the present invention relates to a rig for multi-camera photographing, a cover frame, a center base plate fixed and installed in a center line over the cover frame, and a left rotational movement plate and a right rotational movement plate disposed on the left and right sides of the center base plate and disposed in such a way as to rotatably move around rotational movement shafts protruded over the cover frame.

In an embodiment of the present invention, the rotational movement shafts may be protruded from a base frame coupled to the bottom of the cover frame.

Furthermore, in such an embodiment, the rig may further include fixing screws screwed onto the rotational movement shafts. When the fixing screws are fastened, the rotation of the left/right rotational movement plates for the rotational movement shafts may be fixed or released.

In another embodiment of the present invention, the base frame include a pair of encoder motors providing the motor shaft which are the rotational movement shafts and a motor drive driving the encoder motors. The cover frame is coupled to the base frame in such a way as to cover the motor drive and the pair of encoder motors. The motor drive rotatably moves the left/right rotational movement plates at a specific angle by associating and driving the pair of encoder motors or driving the pair of encoder motors independently.

In this case, the motor drive may be disposed between the pair of encoder motors.

Furthermore, the fronts of the base frame and the cover frame on the left and right sides may have respective arc edges corresponding to the rotational movement tracks of the left/right rotational movement plates.

Furthermore, each of the left/right rotational movement plates may include a ball caster configuring to perform rolling friction with the top of the cover frame.

In an embodiment of the present invention, arc slits corresponding to the respective rotational movement tracks of the left/right rotational movement plates are formed in the cover frame, and guide members inserted into the slits are provided in the left/right rotational movement plates.

In this case, each of the guide members may include a first member vertically fixed to each of the left/right rotational movement plates, a second member movably coupled to a pin protruded from the first member and configured to include a protrusion part inserted into an insolated space between the cover frame and the base frame, and a rotation knob screwed onto the pin. A movement of the left/right rotational movement plate for the cover frame may be prohibited or released in response to the screw of the rotation knob.

Furthermore, identifiers indicative of angles for the rotation center of each of the left/right rotational movement plates may be indicated along arc edges formed in the base frame or the cover frame. The guide members may include guidelines along the center lines of the left/right rotational movement plates.

In an embodiment of the present invention, the rig may further include auxiliary frames coupled to both sides of the base frame and configured to extend the area of the cover frame.

In this case, the rig may further include auxiliary frames coupled to both sides of the base frame and configured to extend the area of the cover frame. A second slit extended from a slit formed in the cover frame and configured to have the same curvature as the slit is formed in each of the auxiliary frames.

A rig for multi-camera photographing according to an embodiment of the present invention may further include a balance weight configured to comprise rods detachably coupled mounting holes provided in one face of the base frame adjacent to the rotational movement shaft and a ballast coupled to the rods. The auxiliary frame may have a fan shape having an edge extended from an arc edge formed in the cover frame and configured to have the same curvature as the arc edge.

Alternatively, the rig for multi-camera photographing according to an embodiment of the present invention can replace the function of a balance weight by varying the center to which a load is applied because the movable support shaft capable of sliding in the direction in which the center base plate has been extended is provided at the bottom of the base frame.

<Description of reference numerals>

Figure 1:
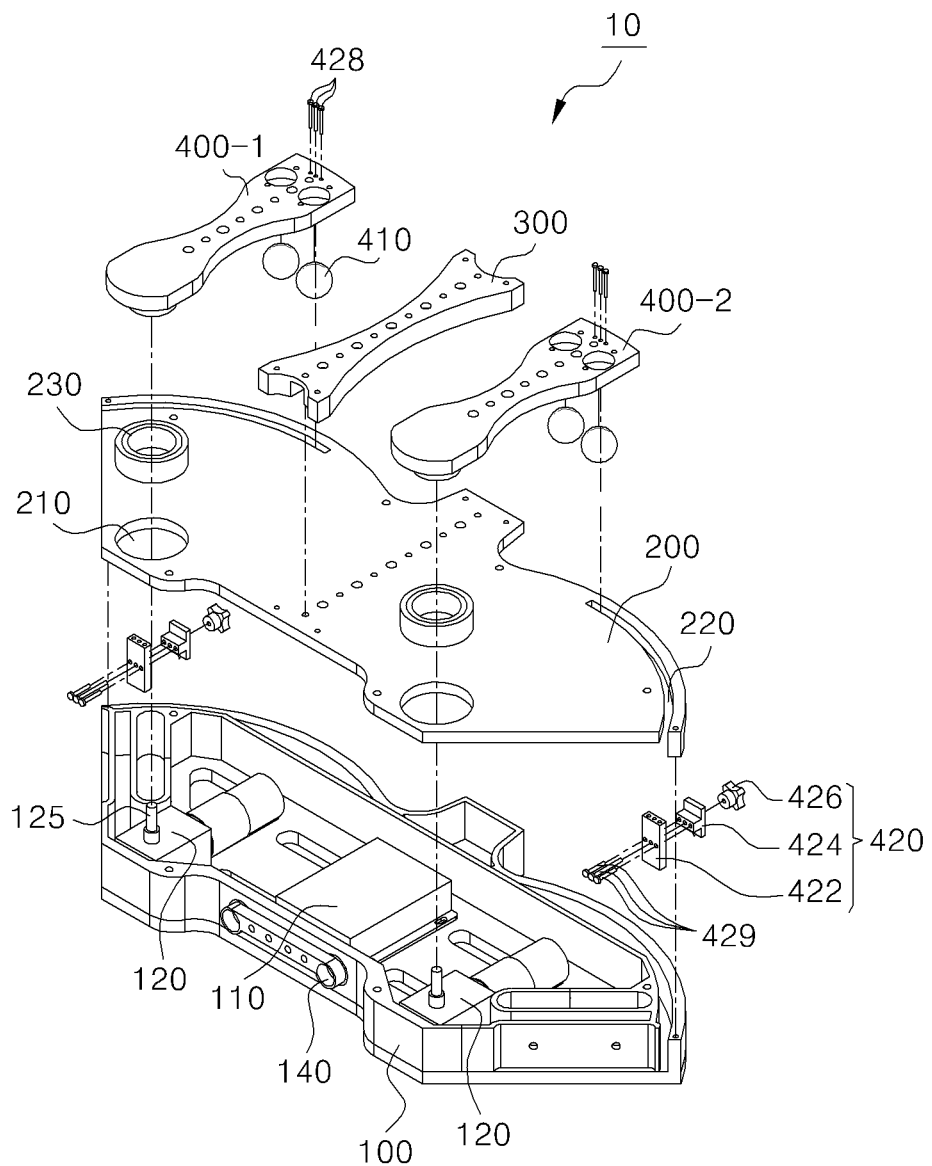
FIG. 1 is an exploded perspective view of a rig for multi-camera photographing in accordance with an embodiment of the present invention.

| | |
|---|---|
| 10: rig for multi-camera photographing | |
| 100: base frame | 110: motor drive |
| 120: encoder motor | 125: motor shaft |
| 130: identifier | 200: cover frame |
| 210: through hole | 220: slit |
| 300: center base plate | 410: ball caster |
| 400-1: left rotational movement plate | |
| 400-2: right rotational movement plate | |
| 420: guide member | 422: first member |

<Description of reference numerals>

| | |
|---|---|
| 424: second member | 426: rotation knob |
| 428: fixed pin | 429: protrusion pin |
| 430: guideline | 500: auxiliary frame |
| 510: second slit | 600: balance weight |
| 610: rod | 620: ballast |
| 700: movable support shaft | 820: fixing screw |
| 810: rotational movement shaft | |

DETAILED DESCRIPTION

Hereinafter, embodiments of the present invention are described n detail with reference to the accompanying drawings.

In describing the embodiments of the present invention, a description of known elements evidently understandable by those skilled in the art will be omitted in order to prevent the gist of the present invention from making unnecessarily vague. The thickness of lines and the size of elements shown in the drawings may have been enlarged for the clarity of a description and for convenience' sake.

Figure 2:
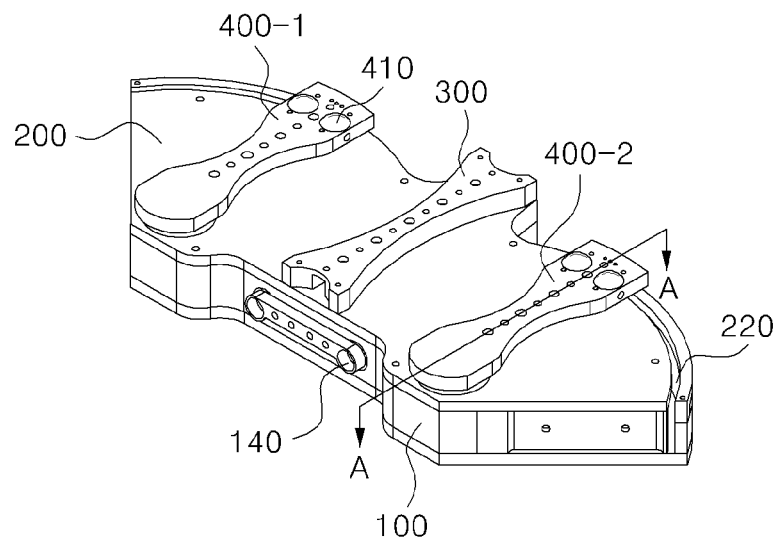
FIG. 2 is an assembly perspective view of the rig for multi-camera photographing shown in FIG. 1.

An embodiment of a rig 10 for multi-camera photographing is described below with reference to FIGS. 1 and 2.

The rig 10 for multi-camera photographing 10 according to an embodiment basically includes a base frame 100, a cover frame 200, encoder motors 120 and a motor drive 110 disposed between the base and cover frames 100 and 200, a center base plate 300 disposed over the cover frame 200, and left/right rotational movement plates 400-1 and 400-2.

The base frame 100 is a bottom plate that forms the frame of the rig 10 for multi-camera photographing. Walls having a specific height are protruded and formed in part of the circumference and internal area of the bottom plate so that they withstand weight of three cameras mounted on the rig 10 for multi-camera photographing and have sufficient strength to the extent that the cameras are not deformed.

The motor drive 110 is provided over the base frame 100 along the center line of the base frame 100. The encoder motors 120 are respectively fixed on the left and right sides of the motor drive 110 at the center. Accordingly, weight balancing is performed on the left and right sides of the base frame 100.

The motor drive 110 is a driver for actuating the pair of encoder motors 120 on a designated time or at a specific angle in response to a command from an external controller (not shown). The encoder motors 120 may be driven independently and individually or may be associated and simultaneously driven to the same degree. That is, the encoder motors 120 may be driven separately and asynchronously so that they have different rotation angles and directions or may be driven at the same time. In this case, the "same extent" may mean that the left/right rotational movement plates 400-1 and 400-2 have the same rotation angle because they are symmetrical to each other on the basis of the center base plate 300, but may have opposite directions.

In an embodiment, a worm gear type may be applied to the encoder motor 120. The reason for this is that a worm gear is suitable for driving the left/right rotational movement plates 400-1 and 400-2 because the worm gear has a high deceleration ratio and a one-sided gear and thus does not require a braking unit.

The cover frame 200 is coupled to the base frame 100 so that it covers the motor drive 110 and the pair of encoder motors 120 mounted on the base frame 100. Furthermore, a through hole 210 through which a motor shaft 125 protruded from each of the encoder motors 120 placed on the lower side of the motor shaft 125 passes is formed in the cover frame 200. In this case, as shown in FIG. 1, the base frame 100 and the cover frame 200 may have almost the same shape, but is not limited thereto.

The thickness of the cover frame 200 may be made thin compared to the base frame 100 to the limits that that the cover frame 200 is able to maintain proper strength because a load applied to the rig 10 for multi-camera photographing is finally delivered to the base frame 100.

The three plates 300, 400-1, and 400-2 on which three cameras may be mounted are installed over the cover frame 200. The three plates 300, 400-1, and 400-2 may have a fixed type plate and a rotation type plate by taking into consideration the role of an installed camera.

The center base plate 300 disposed on the cover frame 200 along the center line of the cover frame 200 is a fixed type plate and is a plate for installing a camera placed at the center of the rig 10 for multi-camera photographing. If a plurality of cameras is installed in a single rig for multi-projection photographing, the angles of cameras on the left and right sides may be easily controlled on the basis of a camera placed at the center. In an embodiment of the present invention, the center base plate 300 is a fixed type plate.

In contrast, the left rotational movement plate 400-1 and the right rotational movement plate 400-2, that is, rotation type plates having variable angles, are disposed on the left and right sides of the center base plate 300. The left/right rotational movement plates 400-1 and 400-2 are configured to be substantially symmetrical to each other on the basis of the center line of the cover frame 200 in which the center base plate 300 has been installed. Accordingly, a description of the rotational movement plate on any one side may be applied to the rotational movement plate on the other side.

If a description is given on the basis of the left rotational movement plate 400-1, one end of the left rotational movement plate 400-1 is coupled to the motor shaft 125 protruded over the through hole 210 formed in the cover frame 200. Accordingly, when the encoder motor 120 is driven on a designed time or at a designated angle by the driving of the motor drive 110 controlled in response to a command from the external controller (not shown), the left rotational movement plate 400-1 is rotatably moved around the motor shaft 125 on a designed time or at a designated angle.

For the smooth rotation of the left rotational movement plate 400-1, the left rotational movement plate 400-1 may be coupled to the motor shaft 125 using a bearing 230. The rotation angle of the left rotational movement plate 400-1 may be designed to be rotated from 0° that is parallel to the center base plate 300 up to 45° in the counterclockwise direction (the right rotational movement plate is rotated in the clockwise direction). The bearing 230 may be a cross-roller bearing capable of rotating in the state in which a load has been applied to the bearing 230 both in the axial direction and a direction orthogonal toe the axial direction.

The right rotational movement plate 400-2 basically has the same configuration as the left rotational movement plate 400-1 except that it has an opposite rotation direction.

As described above, the rig 10 for multi-camera photographing according to an embodiment of the present invention includes a total of the three plates including the fixed type center base plate 300 and the rotatable left/right rotational movement plates 400-1 and 400-2. A camera is mounted on each of the three plates so that the three cameras may perform multi-projection photographing. In some embodiments, cameras less than 3 may be mounted and perform photographing.

In this case, if a total of the three cameras is mounted on the single rig 10 for multi-camera photographing, a reduction of the rig 10 for multi-camera photographing needs to be taken into consideration because the three cameras have heavy weight.

To this end, in an embodiment of the present invention, the edges (i.e., the directions facing the cameras) of the fronts of the base frame 100 and the cover frame 200 are formed to have arc shapes corresponding to the rotational movement tracks of the left/right rotational movement plates 400-1 and 400-2. That is, weight has been reduced by removing parts other than areas for the rotation of the left/right rotational movement plates 400-1 and 400-2. Furthermore, weight may be reduced by removing part of the remaining part other than areas that belong to the base frame 100 and that are occupied by the motor drive 110 and the encoder motor 120 within the limits that structural strength is not greatly reduced (refer to FIGS. 1 and 6). In this case, the cover frame 200 may have not an incision part unlike the base frame 100 in order to protect electrical unit (e.g., the encoder motors and the motor drive) disposed between the cover frame 200 and the base frame 100 from alien substances, such as water or dust.

The rig 10 for multi-camera photographing according to an embodiment of the present invention has the following basic configuration. In some embodiments, additional elements which may be applied separately or together are described below.

The left/right rotational movement plates 400-1 and 400-2 need to reduce a friction with the cover frame 200 for their smooth rotation because they must be rotated in the state in which heavy cameras have been mounted on the left/right rotational movement plates 400-1 and 400-2. To this end, each of the left/right rotational movement plates 400-1 and 400-2 may include a ball caster 410 that turns around on its axis so that it performs rolling friction with respect to the top of the cover frame 200. In this case, two ball casters 410 may be installed so that a load applied to the ball casters 410 are uniformly distributed.

Furthermore, arc slits 220 corresponding to the rotational movement tracks of the left/right rotational movement plates 400-1 and 400-2 may be formed in the cover frame 200 so that the left/right rotational movement plates 400-1 and 400-2 rotate along their accurate tracks. Elements including guide members 420 inserted into the respective slits 220 may be added to the left/right rotational movement plates 400-1 and 400-2.

Figure 3:
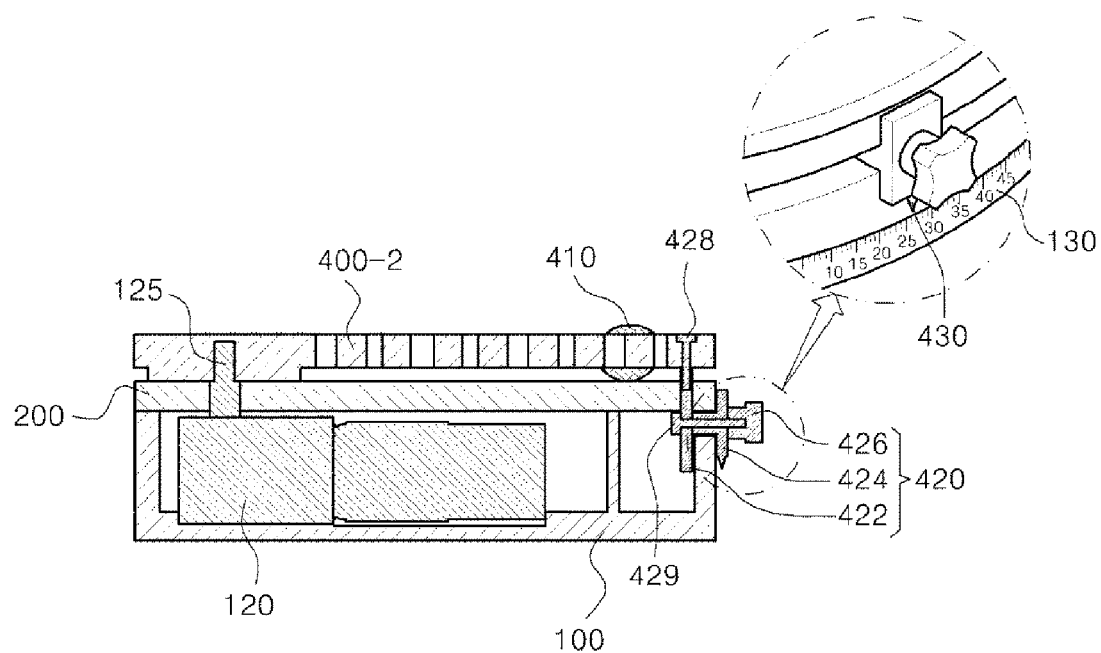
FIG. 3 is a cross-sectional view of the rig cut along line "A-A" of FIG. 2.

A detailed configuration of the guide member 420 is shown in FIG. 3. Each of the guide member 420 includes a first member 422 vertically fixed to each of the left/right rotational movement plates 400-1 and 400-2, a second member 424 movably coupled to a pin 429 protruded from the first member 422 and configured to include a protrusion part inserted into the isolation space between the cover frame 200 and the base frame 100, and a rotation knob 426 screwed onto the protrusion pin 429 and configured to face the second member 424.

The first member 422 is screwed onto three fixed pins 428 that are protruded through three screw holes at the front of the left/right rotational movement plates 400-1 and 400-2, vertically fixed to the left/right rotational movement plates 400-1 and 400-2, and protruded to penetrate the slit 220 formed in the cover frame 200.

The second member 424 is inserted into three protrusion pins 429, protruded to penetrate other three screw holes formed on the side of the first member 422, slightly loosely and may slide with respect to the protrusion pin 429. Only a pin that belongs to the three protrusion pins 429 inserted into the second member 424 and that is placed at the center is lengthily protruded. The two pins on the left and right sides function to restrict the second member 424 so that the second member 424 does not rotate.

Furthermore, the rotation knob 426 is screwed onto the pin at the center and pressurizes the second member 424 against the base frame 100 and the cover frame 200 so that the rotation knob 426 applies a friction force is applied or may be loosely released.

The guide member 420 functions to guide the rotational movement tracks of the left/right rotational movement plates 400-1 and 400-2. When the rotation knob 426 is fastened, the guide member 420 functions to fix the left/right rotational movement plates 400-1 and 400-2, rotated at a specific angle so that they do not easily move, by prohibiting a movement of the left/right rotational movement plates 400-1 and 400-2 with respect to the cover frame 200.

Furthermore, identifiers 130, such as gradation or numbers indicative of angles for the rotation center of each of the left/right rotational movement plates 400-1 and 400-2 along the arc edge formed in the base frame 100 or the cover frame 200, may be indicated (FIG. 3 shows a case where the identifiers are indicated in the base frame 100). The guide member 420 (e.g., the second member in FIG. 3) may include a pointed guideline 430 according to the center line of each of the left/right rotational movement plates 400-1 and 400-2 so that the angle of each of the left/right rotational movement plates 400-1 and 400-2 may be checked with the naked eye.

Figure 4:
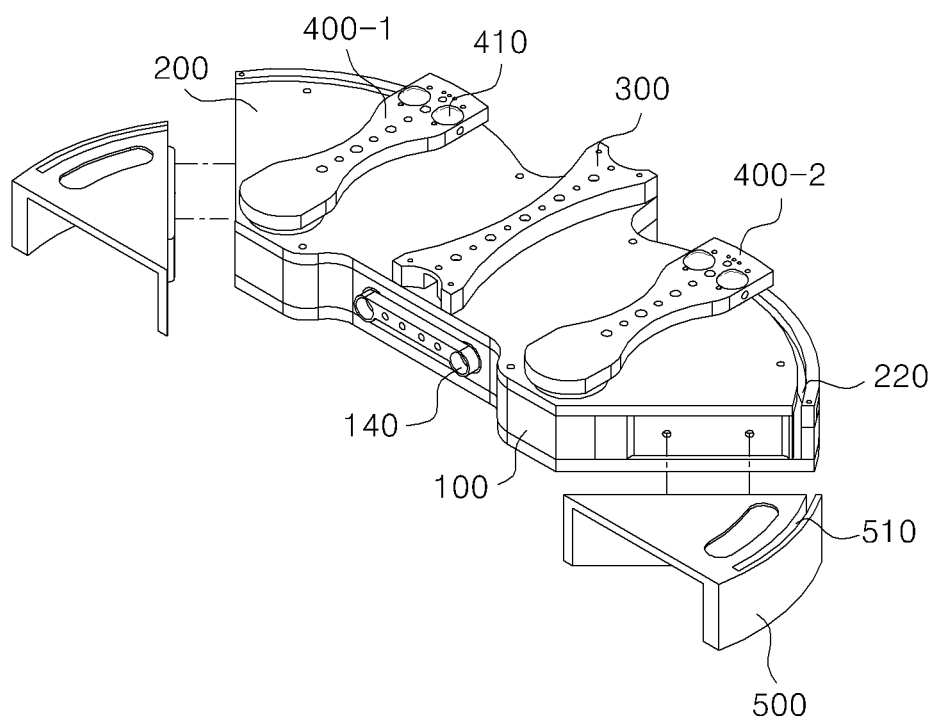
FIG. 4 is a perspective view showing an embodiment in which auxiliary frames have been added to the rig for multi-camera photographing shown in FIG. 2.

Furthermore, in an embodiment of the present invention shown in FIG. 4, the rig may further include auxiliary frames 500 coupled to both sides of the base frame 100 and configured to extend the area of the cover frame 200. That is, the auxiliary frames 500 are coupled to the left and right sides of the cover frame 200 so that the left/right rotational movement plates 400-1 and 400-2 are rotated at a wider angle beyond the rotation range basically provided by the cover frame 200. As a result, the cover frame 200 is extended.

In this case, if the arc edges and slits 220 corresponding to the respective rotational movement tracks of the left/right rotational movement plates 400-1 and 400-2 are formed on the left and right sides of the base frame 100 and the cover frame 200, second slits 510 configured to have the same curvature as the slits 220 formed in the cover frame 200 and extended from the slits 220 may also be formed in the respective auxiliary frames 500.

Furthermore, if the auxiliary frames 500 have fan shapes extended from the arc edges of the cover frame 200 and configured to have the edges of the same curvature, unity with the main body of the rig 10 for multi-camera photographing can be achieved, and it may be advantageous in terms of a reduction of weight. Identifiers, such as gradation or numbers, may be consecutively indicated in the auxiliary frames 500 as in the cover frame 200.

Furthermore, in some embodiments, the rig may further include mounting holes 140 provided in one face (i.e., a lower face in FIG. 5) of the base frame 100 adjacent to the motor shaft 125 and a balance weight 600 configured to include rods 610 detachably coupled to the mounting holes 140 and a ballast 620 coupled to the rods 610.

Figure 5:
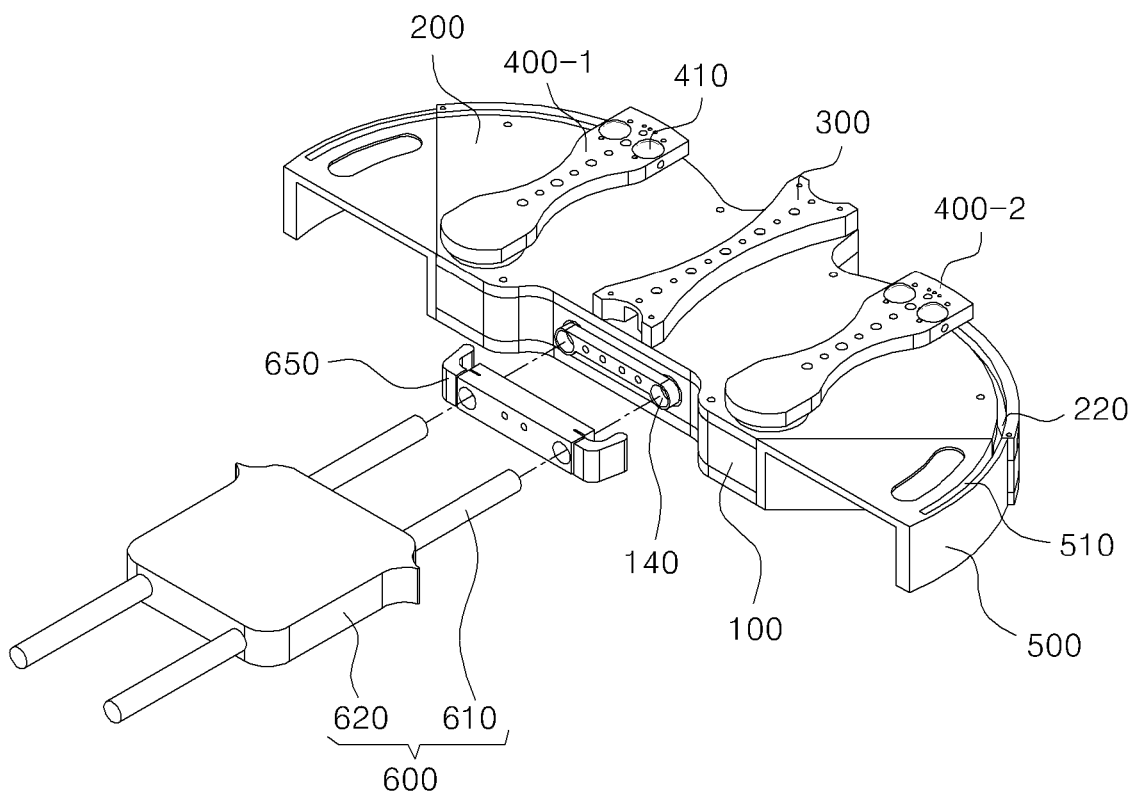
FIG. 5 is a perspective view showing another embodiment in which a balance weight is mounted on the rig for multi-camera photographing shown in FIG. 2.

The balance weight 600 is balance means installed in the rear of a camera having relatively light weight and configured to prevent the rig 10 for multi-camera photographing from falling down due to weight of several cameras. Accordingly, as shown in FIG. 5, the balance weight 600 may be extended backward along the center line of the rig 10 for multi-camera photographing, that is, the extension line of the center base plate 300 for right and left balance. The center of gravity of the balance weight 600 may be moved so that the number of mounted ballasts 620 is controlled or that the ballast 620 is movable along the rods 610.

Furthermore, the rods 610 of the balance weight 600 may be firmly mounted using a clamp 650 coupled to the mounting holes 140 of the base frame 100.

Figure 6:
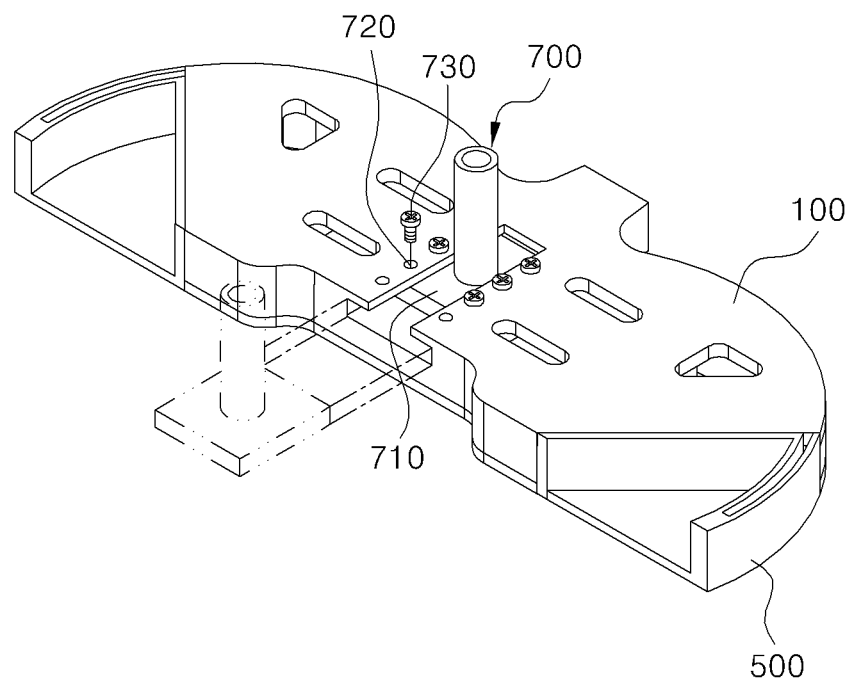
FIG. 6 is a perspective view showing the structure of a movable support shaft provided at the bottom of the rig for multi-camera photographing shown in FIG. 2.

Alternatively, FIG. 6 shows another embodiment in which the rig 10 for multi-camera photographing performs weight balancing without using the balance weight 600. In the embodiment of FIG. 6, a movable support shaft 700 along which the center base plate 300 may slide in the extended direction of the center base plate 300 is configured at the bottom of the base frame 100. For example, a groove including a protrusion 710 may be formed in the center line at the bottom of the base frame 100, and the movable support shaft 700 is inserted into the groove in such a way as to slide.

The rig 10 for multi-camera photographing according to an embodiment of the present invention is mounted on a track dolly, jimmy jib, or techno crane unlike in a tripod or track and used in photographing. If the adaptor of the rig 10 for multi-camera photographing which is mounted on a cradle unit for photographing is formed of the movable support shaft 700, the rig 10 for multi-camera photographing can be balanced because a support point is moved due to the front and rear movement of the movable support shaft 700 and the center to which a load is applied is varied.

In some embodiments, the movable support shaft 700 may be firmly fixed in such a manner that the movable support shaft 700 is pressurized by puncturing screw holes 720 in the protrusion 710 and inserting bolts 730 into the screw holes.

In the aforementioned embodiments of the rig 10 for multi-camera photographing, the rotation angle and direction of each of the left/right rotational movement plates 400-1 and 400-2 is automatically controlled using the encoder motor 120. Yet another embodiment in which the left/right rotational movement plates 400-1 and 400-2 may be manually moved without using the encoder motor 120 and the motor drive 110 is shown in FIG. 7.

Figure 7:
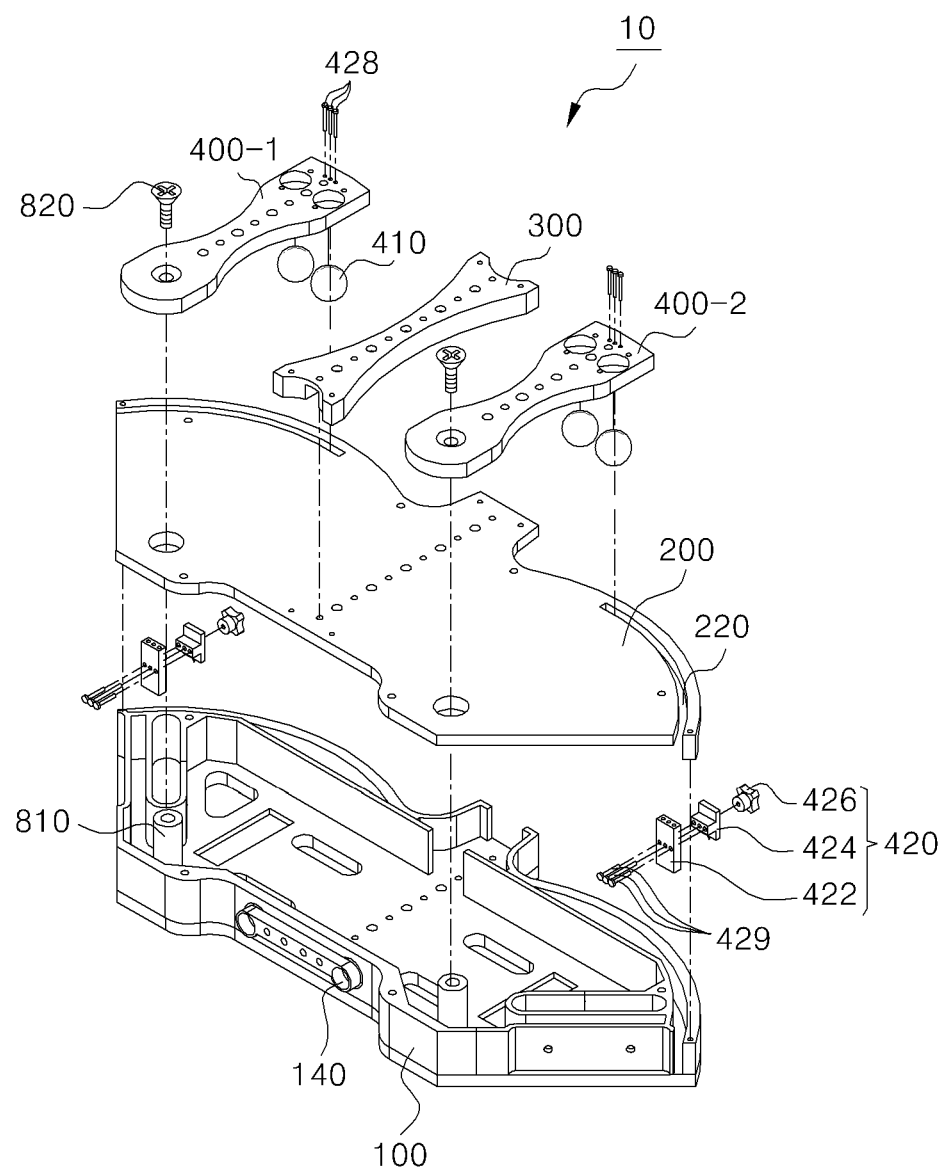
FIG. 7 is an exploded perspective view of a rig for multi-camera photographing in accordance with another embodiment of the present invention.

In a manual rig 10 for multi-camera photographing shown in FIG. 7, rotational movement shafts 810 protruded from the base frame 100 are provided in response to locations corresponding to the respective motor shafts 125 of the encoder motors 120, and the left/right rotational movement plates 400-1 and 400-2 are fit into the respective rotational movement shafts 810 in such a way as to rotatably move.

In such an embodiment, a fixing screw 820 may be screwed onto the top of the rotational movement shaft 810 so that each of the left/right rotational movement plates 400-1 and 400-2 is rotated at a proper angle and fixed. That is, when the fixing screws 820 are fastened, the left/right rotational movement plates 400-1 and 400-2 are pressed against the cover frame 200 and may be fixed without being rotatably moved.

Figure 8:
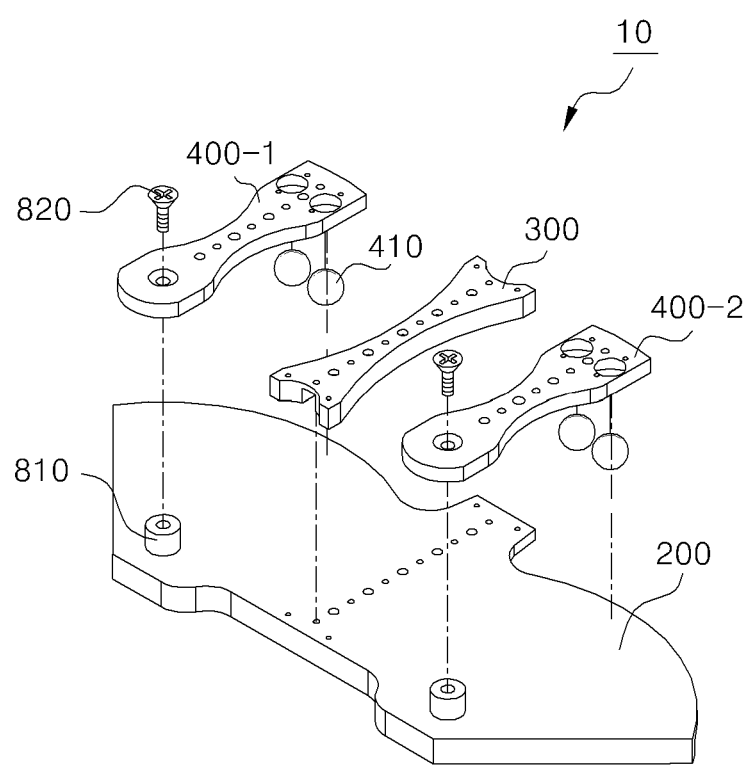
FIG. 8 is an exploded perspective view of a modified embodiment of the rig for multi-camera photographing shown in FIG. 7.

Furthermore, FIG. 8 shows a modified embodiment of the manual rig 10 for multi-camera photographing. In such an embodiment, the manual rig 10 includes only the cover frame 200 without the base frame 100, and the rotational movement shafts 810 are protruded and formed in the cover frame 200 itself. In this case, each of the fixing screws 820 has a simple configuration except that the cover frame 200 needs to have a slightly thick thickness so that it may withstand the entire load by taking into consideration that the base frame 100 is not included or that the guide member 420 and the slit 220 for the guide member 420 are not included.

Furthermore, only some characteristic elements of the manual rig 10 for multi-camera photographing shown in FIGS. 7 and 8 have been described compared to the automatic (or electromotive type) rig 10 for multi-camera photographing. It is to be noted that elements, such as the identifier 300, the ball caster 410, the guide member 420, the auxiliary frame 500, the balance weight 600, and the movable support shaft 700, may be identically applied to the manual rig 10 for multi-camera photographing unless the manual rig 10 for multi-camera photographing shown in FIGS. 7 and 8 is not compatible with the automatic (or electromotive type) rig 10 in structure or may not be applied.

Although some embodiments of the present invention have been shown and described, those skilled in the art to which the present invention pertains may understand that the present embodiment may be modified without departing the principle or spirit of the present invention. Accordingly, the scope of the present invention may be defined by the attached claims and equivalents thereof.

In accordance with an embodiment of such a rig for multi-camera photographing, the rotation angle of each rotational movement plate can be easily controlled because the left/right rotational movement plates provided on the left and right sides of the fixed type center base plate are freely rotated in both clockwise and counterclockwise directions. Accordingly, there is an advantage in that an angle between cameras when a multi-projection image is captured can be conveniently controlled.

Furthermore, if the left/right rotational movement plates are configured to be rotated by the encoder motors, the rotation angle of each rotational movement plate can be controlled accurately and freely through control of the encoder motors. Accordingly, there is an advantage in that an angle between cameras can be controlled accurately, conveniently, and automatically.

What is claimed is:

1. A rig for multi-camera photographing, comprising:
    a cover frame;
    a center base plate fixed and installed in a center line over the cover frame; and
    a left rotational movement plate and a right rotational movement plate disposed on left and right sides of the center base plate and disposed in such a way as to rotatably move around rotational movement shafts protruded over the cover frame.

2. The rig of claim 1, wherein the rotational movement shafts are protruded from a base frame coupled to a bottom of the cover frame.

3. The rig of claim 1, further comprising fixing screws screwed onto the rotational movement shafts, wherein when the fixing screws are fastened, a rotation of the left/right rotational movement plates for the rotational movement shafts is fixed or released.

4. The rig of claim 2, wherein:
    the base frame comprises a pair of encoder motors providing the motor shaft which are the rotational movement shafts and a motor drive driving the encoder motors,
    the cover frame is coupled to the base frame in such a way as to cover the motor drive and the pair of encoder motors, and
    the motor drive rotatably moves the left/right rotational movement plates at a specific angle by associating and driving the pair of encoder motors or driving the pair of encoder motors independently.

5. The rig of claim 4, wherein the motor drive is disposed between the pair of encoder motors.

6. The rig of claim 2, wherein fronts of the base frame and the cover frame on left and right sides have respective arc edges corresponding to rotational movement tracks of the left/right rotational movement plates.

7. The rig of claim 1, wherein each of the left/right rotational movement plates comprises a ball caster configuring to perform rolling friction with a top of the cover frame.

8. The rig of claim 2, wherein:
    arc slits corresponding to respective rotational movement tracks of the left/right rotational movement plates are formed in the cover frame, and
    guide members inserted into the slits are provided in the left/right rotational movement plates.

9. The rig of claim 8, wherein:
    each of the guide members comprises a first member vertically fixed to each of the left/right rotational movement plates, a second member movably coupled to a pin protruded from the first member and configured to comprise a protrusion part inserted into an isolated space between the cover frame and the base frame, and a rotation knob screwed onto the pin, and
    a movement of the left/right rotational movement plate for the cover frame is prohibited or released in response to the screw of the rotation knob.

10. The rig of claim 9, wherein:
    identifiers indicative of angles for a rotation center of each of the left/right rotational movement plates are indicated along arc edges formed in the base frame or the cover frame, and
    the guide members comprise guidelines along center lines of the left/right rotational movement plates.

11. The rig of claim 2, further comprising auxiliary frames coupled to both sides of the base frame and configured to extend an area of the cover frame.

12. The rig of claim 8, further comprising auxiliary frames coupled to both sides of the base frame and configured to extend an area of the cover frame, wherein a second slit extended from a slit formed in the cover frame and configured to have curvature identical with curvature of the slit is formed in each of the auxiliary frames.

13. The rig of claim 12, wherein the auxiliary frame has a fan shape having an edge extended from an arc edge formed in the cover frame and configured to have curvature identical with curvature of the arc edge.

14. The rig of claim 2, further comprising a balance weight configured to comprise rods detachably coupled mounting holes provided in one face of the base frame adjacent to the rotational movement shaft and a ballast coupled to the rods.

15. The rig of claim 2, wherein a movable support shaft which is able to slide along a direction in which the center base plate has been extended is provided at the bottom of the base frame.

* * * * *